Figure 2:
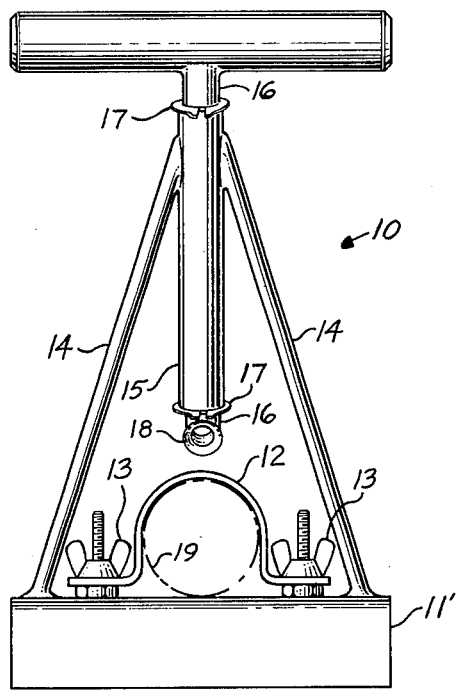
Figure 1:
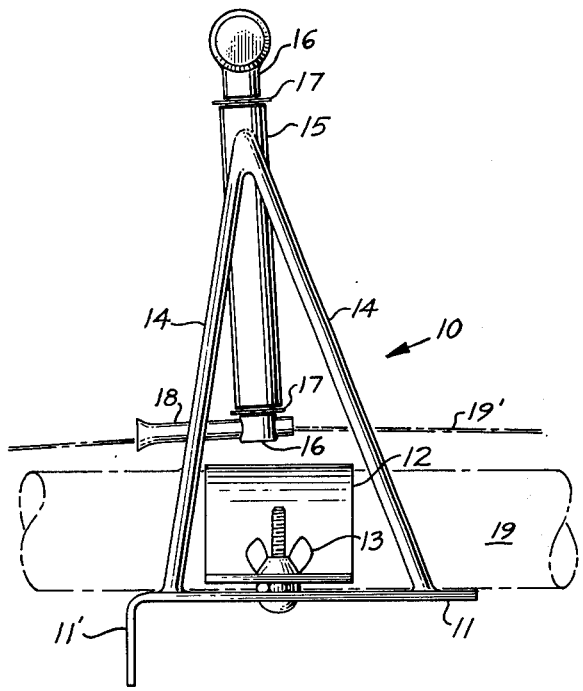
Figure 3:
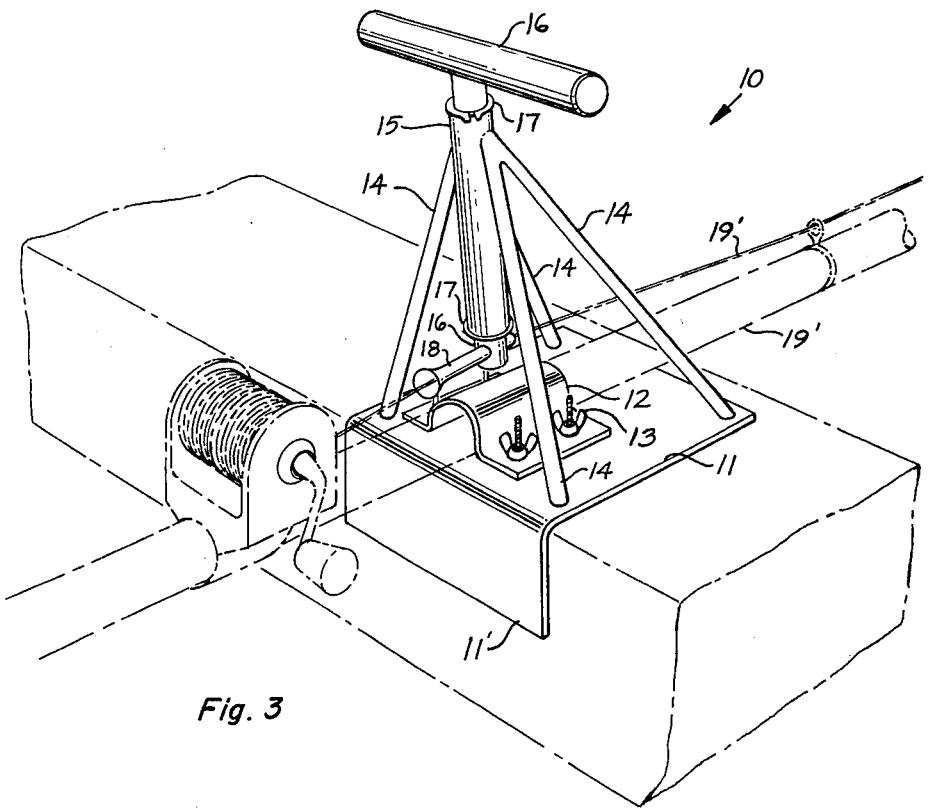

United States Patent [19]

Hawkins, III

[11] 3,966,151

[45] June 29, 1976

[54] BOTTOM FISHING DEVICE

[76] Inventor: Carl V. Hawkins, III, 18801 Vicci St., Canyon Country, Calif. 91351

[22] Filed: Jan. 18, 1974

[21] Appl. No.: 434,553

[52] U.S. Cl. .................................. 43/21.2; 43/24; 248/523; 248/536
[51] Int. Cl.² .................. A01R 97/10; A01K 97/10
[58] Field of Search ................. 248/38, 39, 40, 41, 248/42, 43; 43/19.2, 21.2, 24

[56] References Cited
UNITED STATES PATENTS

| | | | |
|---|---|---|---|
| 2,880,546 | 4/1959 | Pemberton | 43/24 |
| 3,222,811 | 12/1965 | Henson | 43/24 X |
| 3,484,066 | 12/1969 | Aunspaugh | 248/41 |
| 3,601,919 | 8/1971 | Nixon | 248/42 |
| 3,655,155 | 4/1972 | Taylor | 248/38 |
| 3,772,816 | 11/1973 | Ridge | 248/42 |

Primary Examiner—J. Franklin Foss
Attorney, Agent, or Firm—Harold O. Holaday

[57] ABSTRACT

A base having a fishing rod clamping means and a "T" shaped handle having limited rotation mounted thereon.

1 Claim, 3 Drawing Figures

U.S. Patent  June 29, 1976  3,966,151

BOTTOM FISHING DEVICE

This invention relates to a new and useful device for fishing. More specifically, it is used in fishing on the bottom of a body of water.

When fishing on the bottom of a body of water, large amounts of line must be stripped from the reel in order to reach the bottom, and it has been difficult to wind back on the reel, especially when there is a fish on the line. Prior devices include a socket worn about the waist and this provides a receptacle in which to place the butt end of the handle of the fishing rod. However, sufficient leverage cannot be obtained from this method to facilitate reeling the line.

The invention may be briefly described as a base having a clamping means affixed thereto, adapted to receive the handle of a fishing rod. A T-shaped handle is mounted on the base end and has a limited rotation. A line guide is affixed to the handle.

A base having a clamping means affixed thereto, adapted to receive the handle of a fishing rod. A T-shaped handle is mounted on and above the base and has a limited rotation. A line guide is affixed to the handle.

FIG. I is a side view of the invention showing the clamp and the handle and line guide.

FIG. II is an end view of the invention.

FIG. III is a view showing the invention in place on the rail of a boat.

The invention is described as having a base 10. One end of the base is bent downwardly to form a flange 11. A clamping means 12 is affixed to the base and is tightened by two wingnuts 13. A plurality of supports 14 are affixed to the base. The supports 14 extend substantially upwardly from the base and at their termination are affixed to a tube 15 which is journaled to receive the bottom end of a T handle 16. The bottom end of the T handle 16 is locked against axial movement by two lock rings 17; a tube is journaled through the bottom end of T handle 16.

In use, a fishing pole handle is positioned under clamp 12 and tightened by means of the wing nuts 13 so that the assembly becomes one piece. Line from the reel is threaded through the flared tube and on through the ferrels of the fishing rod. Then, sufficient line is stripped from the reel to allow the bait to rest on the bottom of the lake or ocean.

The fishing pole clamp and rod assembly is laid across the rail of the boat so that the down-turned portion of base 10 is on the inside of the railing. The rest of the base lies flat on the railing. When a fish is hooked, one hand pushes down on the handle while the other hand reels in the fish. The handle may be rotated so as to provide a level wind action.

I claim:
1. In a device of the class described comprising,
    a. A Base.
    b. Said base having a portion thereof turned downwardly at substantially a right angle.
    c. A tubular element spaced apart from and supported by said base.
    d. A T-shaped handle element pivotally supported by said tubular element.
    e. A tube attached to the lower end of the handle element.
    f. A clamp attached to said base and adapted to receive and hold a fishing rod.

* * * * *